UNITED STATES PATENT OFFICE.

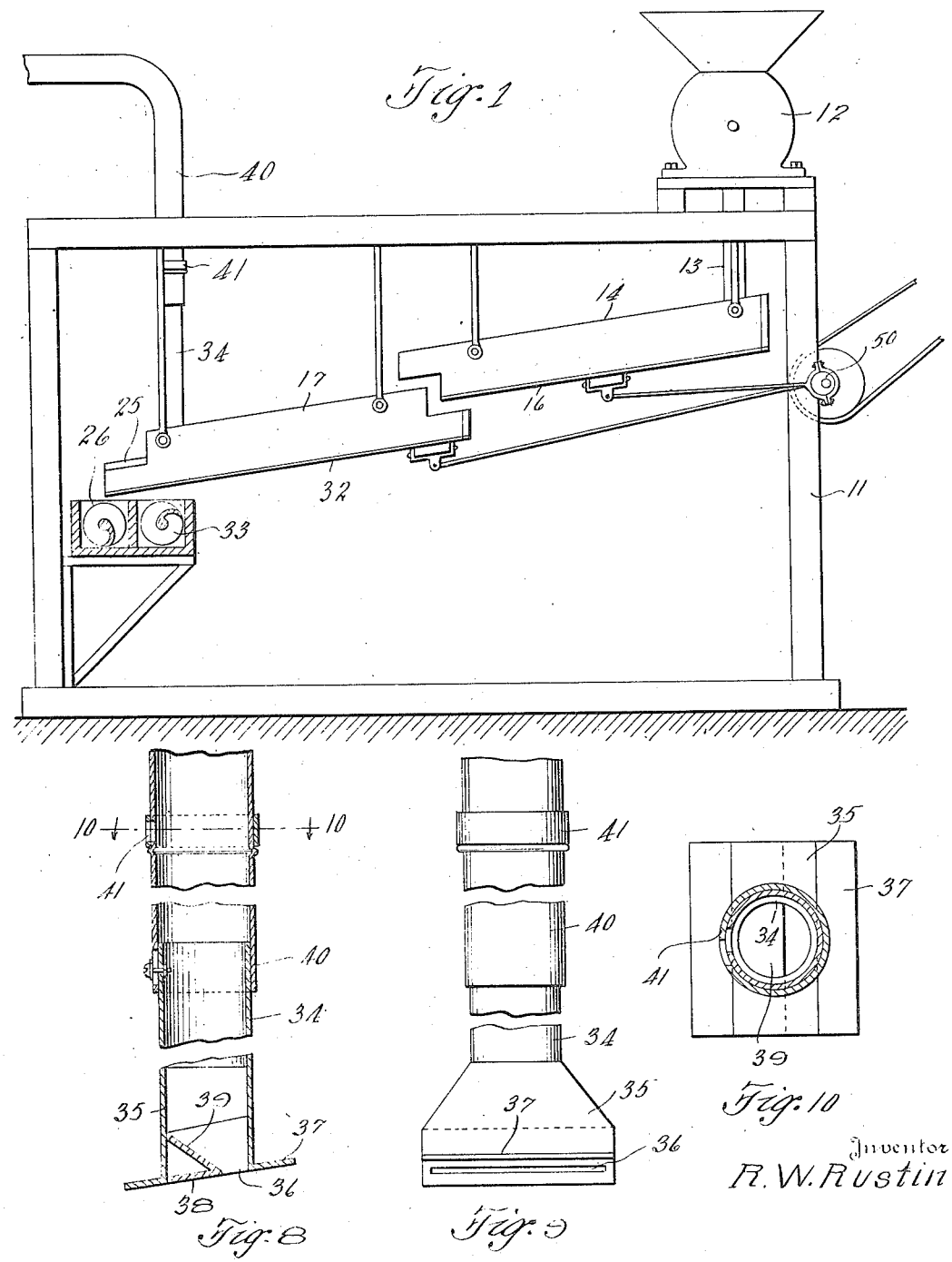

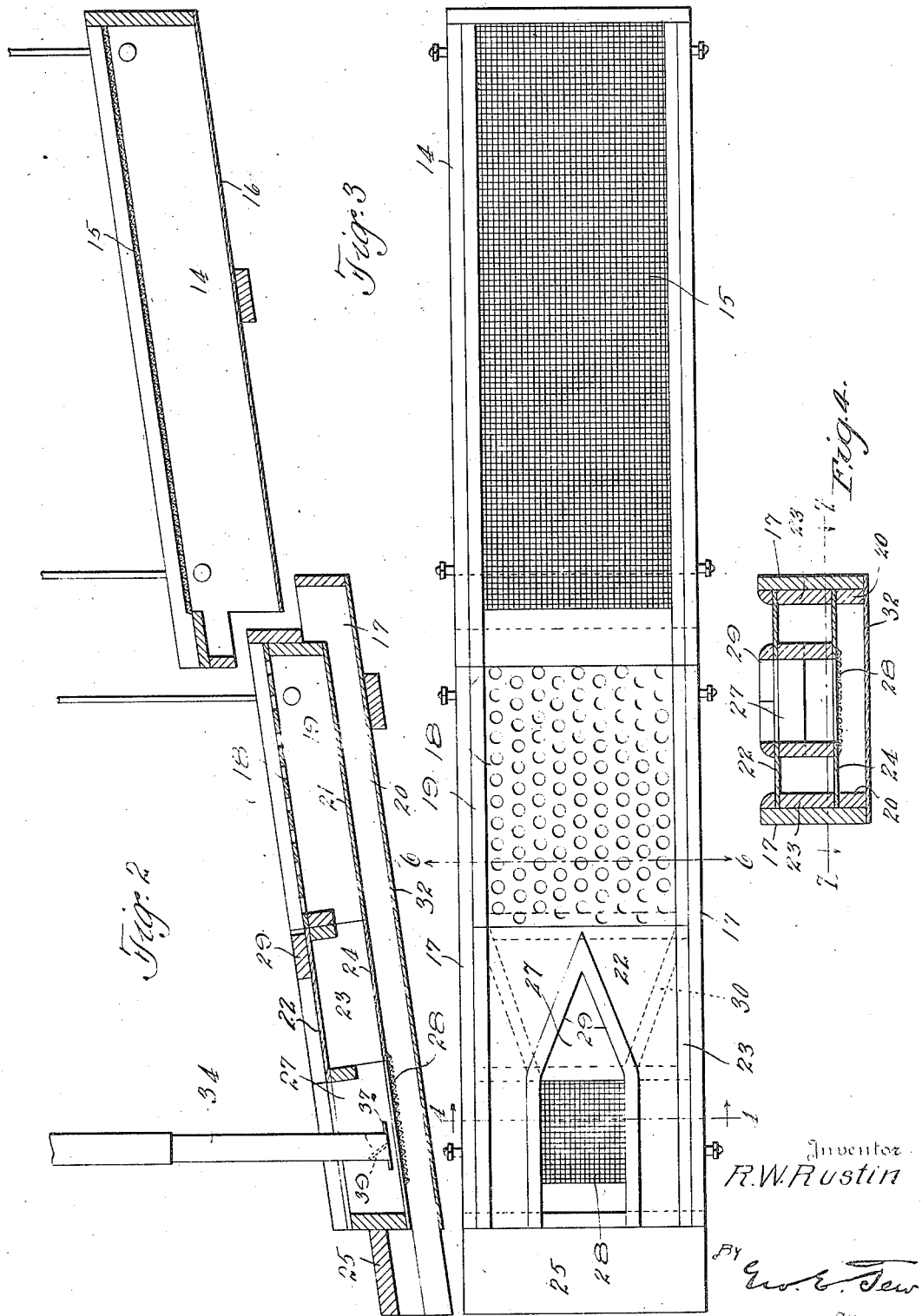

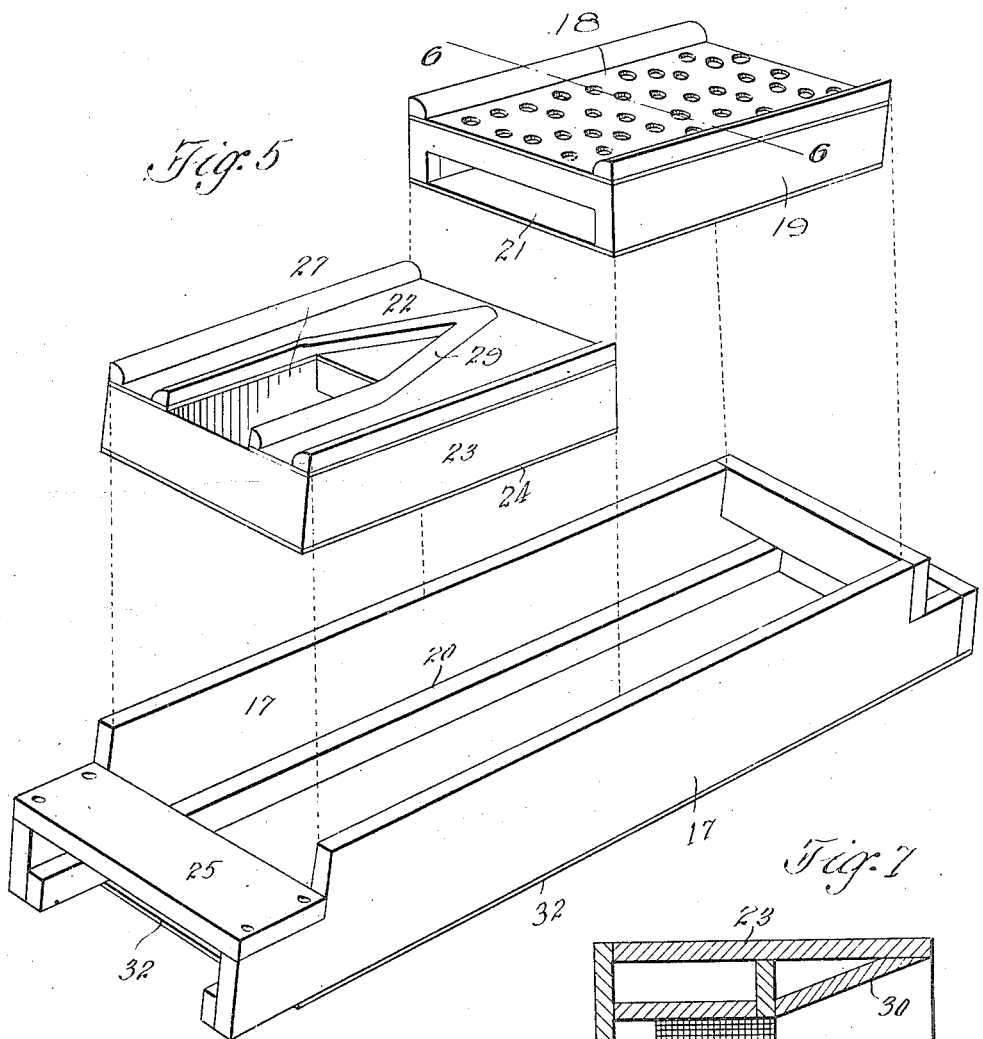
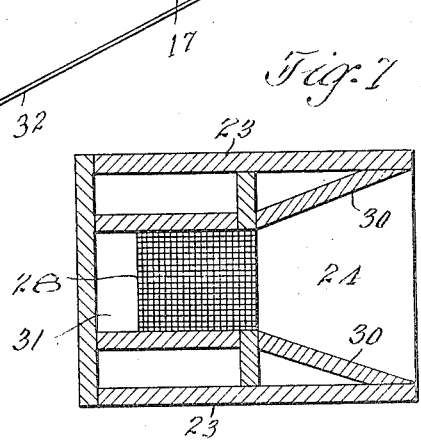
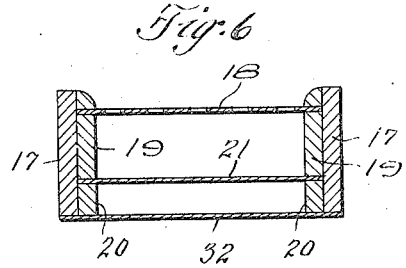

RUFUS W. RUSTIN, OF BISHOPVILLE, SOUTH CAROLINA.

PROCESS OF AND APPARATUS FOR SEPARATING COTTON-SEED HULLS AND MEATS.

1,226,263.

Specification of Letters Patent.

Patented May 15, 1917.

Application filed November 6, 1916. Serial No. 129,783.

*To all whom it may concern:*

Be it known that I, RUFUS W. RUSTIN, a citizen of the United States, residing at Bishopville, in the county of Lee and State of South Carolina, have invented certain new and useful Improvements in Processes of and Apparatus for Separating Cotton-Seed Hulls and Meats, of which the following is a specification.

This invention relates to the separation of grain, and especially to the separation of meats from the hulls of cotton seeds, and it embodies a process or mode of treatment and also an apparatus or machine.

In the present state of the art of milling cotton seed it is common to remove practically all of the lint from the seed, because of the value of the lint, and in consequence of this the seed are left bald or clean, and without enough lint to hold the hull together when the seed is passed through the huller. So the hulls are largely broken up, or come off in small pieces, which mix with the meats, and with the processes of separation now in use it is practically impossible to separate these fine hulls from the meats. The objectionable result of this is that the meal remaining after the oil is pressed out contains more hulls than the law allows, since the laws of various States require a certain standard content, particularly with respect to the ammonia percentage, which decreases in proportion to the increase of the amount of hulls.

It is the object of the present invention to remedy these defects and enable the mills to obtain an improved separation, by taking all or practically all of the hulls from the meats. This object is effected by improved separating devices, coöperating in an improved manner and embodying a gravity process in addition to a separation according to size.

The invention is illustrated in the accompanying drawings in which Figure 1 is a side elevation of an apparatus embodying the same. Fig. 2 is a longitudinal section of the shaker. Fig. 3 is a plan view of the same. Fig. 4 is a section on the line 4—4 of Fig. 3. Fig. 5 is a perspective showing one of the shaker frames and the screens which fit therein. Fig. 6 is a section on the line 6—6 of Fig. 5. Fig. 7 is a horizontal section on the line 7—7 of Fig. 4. Fig. 8 is a detail in vertical section of a suction trunk or pipe. Fig. 9 is an elevation of the same, and Fig. 10 is a section on the line 10—10 of Fig. 8.

Referring specifically to the drawings, 11 indicates a frame suitable for supporting the parts hereinafter described. Mounted upon this is a huller 12 of any desired construction, and its discharge spout 13 delivers to the head of a shaker 14 which has a fine screen 15 and a closed bottom 16. This screen separates some or all of the very fine meats which fall on the bottom of the shaker and pass off to the bottom of the next shaker 17.

The mass of hulls and relatively coarse meats tail off the screen 15 onto a screen 18 having relatively large perforations. This screen is preferably a perforated plate, and it is mounted on a frame section 19 which rests on cleats 20 in the shaker frame 17, and it acts to separate out the coarse hulls from the finer hulls and the meats which drop through the perforations upon the bottom plate 21 of the section. The coarse hulls tail off the metal 18 on to a top plate 22 of a lower section 23, and the material which passes through the metal 18 flows from the bottom plate 21 to the adjoining bottom plate 24 of the lower section. The coarse hulls passing over the plate 22 fall to a drop board 25 and to a hull conveyer 26.

The plate 22 has an opening 27 therein, and located directly above a fine screen section 28 at the lower end of the bottom plate 24. A bead 29 is provided on the top plate to direct the coarse hulls along the channels beside the opening, and inclined partitions 30 extend between the top and bottom plates 22 and 24 to direct the finer chop, or mixed fine hulls and meats, over the fine screen 28, from which the meats tail off through an opening 31 onto the bottom plate 32 of the main shaker frame 17 which delivers to a meat conveyer 33.

The material which passes over the fine screen 28 consists as stated of meats and fine hulls, and these are practically impossible of separation by any screening action, and consequently a gravity action is resorted to to accomplish the separation. To this end, I provide a suction pipe or trunk 34, through which air is drawn in any suitable way, and this pipe terminates at its lower end in an enlarged head 35 which projects through the opening 27 to a position just above the screen 28. This screen is too fine for a separating action, but serves to permit an upward flow of air through the material passing thereover. The suction head 35 has a mouth or slot 36 extending across the same, at the bottom, with laterally extending lips or flanges 37 and 38 above and below the mouth, and substantially parallel to the screen 28. This affords a restricted space or opening under each lip, and since the lower lip 38 is the wider, the greatest amount of draft will be drawn under the upper lip 37 and over the material as it passes down toward the mouth or slot 36. This action is assisted somewhat by the inclined flange 39 extending across the head just within the mouth and above the lower lip or flange 38. I have found that this particular arrangement gives a more effective action than other forms of mouths. The air trunk has a slip joint at 40 to permit adjustment of the mouth with respect to the material on the screen 28, and I also provide a valve or damper 41 to regulate the suction through the trunk. The shaker may be vibrated by any suitable means, such as by connection to an eccentric 50.

The general operation will be apparent from the above description, but with respect to the air suction separation it may be stated that as the material passes over the screen 28 it is agitated by the vibrations of the shaker, and the lighter hulls will to a large extent ride upon the heavier meats, and the blast of air entering under the lips 37 and 38, as well as through the screen 28, will lift the fine hulls into the air trunk, through the mouth 36, whence they will be carried by the suction to the desired place of discharge. The meats pass off the screen 28 and join the fine meats flowing down the bottom plate 32. The combined screening and pneumatic actions give a practically complete separation of the hulls and the meats, but the former may if desired be carried to known beaters for a finishing operation especially intended to dislodge and separate any very fine meats which may adhere to the hulls. The invention is not limited to the particular arrangement shown and described, but various modifications are possible within the scope of the following claims.

I claim:

1. The method of separating cotton seed hulls and meats, consisting in first, separating the fine meats from the mass, second, separating the coarse meats and fine hulls from the coarse hulls, and then separating the fine hulls from the coarse meats.

2. The method of separating cotton seed hulls and meats consisting in first separating the fine meats from the mass, second separating the coarse meats and fine hulls from the coarse hulls, and then pneumatically separating the fine hulls from the coarse meats.

3. In a separating apparatus, the combination with a shaker having a screen over which the material passes, of an upright suction trunk having an inlet mouth spaced slightly above said screen, said mouth having lips projecting outwardly therefrom and substantially parallel to said screen.

4. In a separating apparatus, the combination with a shaker having an inclined screen over which the material flows, of a suction trunk having a contracted mouth or slot extending across and slightly above said screen, and lips projecting outwardly from opposite edges of said mouth and substantially parallel to the screen.

5. In a separating apparatus, the combination with a shaker having an inclined screen over which the material flows, of a suction trunk having a contracted mouth or slot extending across above said screen, and lips projecting outwardly from opposite edges of said mouth, the lip extending toward the upper end of the screen being narrower than that extending toward the lower end thereof.

6. In a separating apparatus, the combination with a shaker having an inclined screen over which the material flows, of a suction trunk having an enlarged head with a contracted mouth extending across said screen and slightly above the same, the inner wall of said mouth being inclined upwardly and backwardly from the lower lip thereof in the general direction of the flow of said material.

7. In a separating apparatus, the combination with a shaker having an inclined screen over which the material flows, of a suction trunk having a contracted mouth extending across above said screen, and lips projecting outwardly from the upper and lower edges of said mouth and substantially parallel to the screen, the wall of the mouth within the lower lip being inclined upwardly and outwardly from the edge of the mouth.

8. The combination of a shaker comprising a frame having an upper section with a screen having coarse perforations, and a lower section with an upper plate receiving the coarse material from said screen and a lower plate receiving the material passing through said screen, said upper plate having an opening through the same, and the lower plate having a fine screen under said opening, and a suction trunk projecting through said opening into proximity to said fine screen.

9. The combination with a shaker having a coarse screen at the head thereof, an upper plate receiving the coarse material from said screen, and a lower plate receiving the material passing through said screen, said upper plate having an opening through the same, and the lower plate having a fine screen under said opening, and a suction trunk depending through said opening into proximity to said fine screen.

10. A separating apparatus comprising in combination an upper shaker having a fine screen and a lower shaker having an upper plate with coarse perforations receiving the material passing over said screen, a bottom plate receiving the material passing through said plate, and an intermediate plate receiving material passing through said upper plate, said intermediate plate having a fine air screen near the lower end thereof, and a suction device located above and adjacent to said air screen.

In testimony whereof, I affix my signature in presence of two witnesses.

RUFUS W. RUSTIN.

Witnesses:
 EDMUND HUNT LOW,
 GUTHRIE WILLRON WOODHAM.